United States Patent
Hinami

(10) Patent No.: US 7,628,688 B2
(45) Date of Patent: Dec. 8, 2009

(54) GAME APPARATUS, GAME CONTROL METHOD, RECORDING MEDIUM AND PROGRAM

(76) Inventor: Masahiro Hinami, c/o KCE Studios, 2-1, Minatomirai 2-chome, Nishi-ku, Yokohama-shi, Kanagawa 220-8135 (JP)

( * ) Notice: Subject to any disclaimer, the term of this patent is extended or adjusted under 35 U.S.C. 154(b) by 853 days.

(21) Appl. No.: 09/801,996

(22) Filed: Mar. 8, 2001

(65) Prior Publication Data
US 2002/0060427 A1 May 23, 2002

(30) Foreign Application Priority Data
Mar. 10, 2000 (JP) .............................. 2000-066879

(51) Int. Cl.
G06F 17/00 (2006.01)
G06F 19/00 (2006.01)
(52) U.S. Cl. ............... 463/9; 463/7; 463/8; 463/30; 463/31; 463/32; 463/40; 463/41; 463/42; 463/43; 434/11; 434/12; 434/13; 434/14; 434/15; 434/16
(58) Field of Classification Search ............... 463/9, 463/40–43, 7, 8, 30–32; 434/11–16
See application file for complete search history.

(56) References Cited
U.S. PATENT DOCUMENTS

| 5,354,057 A | * | 10/1994 | Pruitt et al. ............... 463/5 |
| 5,390,937 A | * | 2/1995 | Sakaguchi et al. ........ 463/7 |
| 5,484,157 A | * | 1/1996 | King ........................ 273/260 |
| 5,707,288 A | * | 1/1998 | Stephens .................. 463/33 |
| 5,807,174 A | * | 9/1998 | Fukuhara et al. .......... 463/31 |
| 5,880,709 A | * | 3/1999 | Itai et al. .................. 345/629 |
| 5,885,156 A | * | 3/1999 | Toyohara et al. .......... 463/1 |
| 6,093,105 A | * | 7/2000 | Morihira ................... 463/38 |
| 6,146,277 A | * | 11/2000 | Ikeda ........................ 463/43 |

(Continued)

FOREIGN PATENT DOCUMENTS
EP 0 830 879 3/1998

(Continued)

OTHER PUBLICATIONS

Jagged Alliance 2: Instruction Manual. Jagged Alliance 2, Released Mar. 20, 1999. Scanned Copy. [online] [retrieved on Apr. 12, 2006] Retrieved from the Game Manual Archive <URL:http://www.gamemanuals.net/>. Attaching Print Out (34 pages).*

(Continued)

*Primary Examiner*—Dmitry Suhol
*Assistant Examiner*—Milap Shah
(74) *Attorney, Agent, or Firm*—Bachman & LaPointe, P.C.

(57) ABSTRACT

An image data generator of this game apparatus generates, in a combat state, combat image data to display player's combat elements that executes a combat and opponent's combat elements fighting with the player's combat elements on the display unit in real time. This game comprises a distance detector that detects a distance between the player's combat element and the opponent's combat element at the time of changing a normal state to the combat state, and displays an initial image at the beginning of the combat state in accordance with the distance therebetween.

4 Claims, 10 Drawing Sheets

U.S. PATENT DOCUMENTS

| | | | |
|---|---|---|---|
| 6,155,923 A * | 12/2000 | Stephens et al. | 463/1 |
| 6,231,440 B1 * | 5/2001 | Yamashita | 463/7 |
| 6,254,099 B1 * | 7/2001 | Pederson | 273/292 |
| 6,273,818 B1 * | 8/2001 | Komoto | 463/31 |
| 6,304,267 B1 * | 10/2001 | Sata | 345/427 |
| 6,319,129 B1 * | 11/2001 | Igarashi et al. | 463/31 |
| 6,409,604 B1 * | 6/2002 | Matsuno | 463/43 |
| 6,468,157 B1 * | 10/2002 | Hinami et al. | 463/32 |
| 2001/0044335 A1 * | 11/2001 | Satake | 463/7 |
| 2002/0082080 A1 * | 6/2002 | Kojima | 463/31 |

FOREIGN PATENT DOCUMENTS

| | | |
|---|---|---|
| EP | 0 856 340 | 8/1998 |
| EP | 0 893 149 | 1/1999 |
| EP | 0 943 362 | 9/1999 |
| JP | 2000014928 | 1/2000 |
| WO | WO98/15328 | 4/1998 |

OTHER PUBLICATIONS

IGN: Jagged Alliance 2: Reviews, Screenshots, Videos, & More. [online] [retrieved Apr. 12, 2006] <URL:http://pc.ign.com/objects/003/003557.html>. Attaching Print Out (2 pages).*

Abstract of Japanese strategy guide book for computer games issued on May 10, 1997. The document is in Japanese; however, an English translation is also enclosed.

Abstract of Japanese strategy guide book for computer games issued on May 30, 1997. The document is in Japanese; however, an English abstract is also enclosed.

* cited by examiner

GAME APPARATUS, GAME CONTROL METHOD, RECORDING MEDIUM AND PROGRAM

CROSS-REFERENCE TO RELATED APPLICATIONS

This application is based upon and claims the benefit of priority from the prior Japanese Patent Application No. 2000-066879, filed on Mar. 10, 2000, the entire contents of which are incorporated herein by reference.

BACKGROUND OF THE INVENTION

1. Field of the Invention

The present invention relates to a technique for providing a player with an optimal operating environment to play a simulation game. Specifically, the present invention relates to a technique for presenting real attraction of strategies to the game player so that the game player may play a war simulation game by combating both friend and enemy combat elements effectively.

2. Description of the Related Art

Generally, the war simulation game is designed to display a map, which is divided into numerous small regions formed in, e.g., a matrix, and images of combat elements placed in some small regions to combat with each other. Then, the combat elements are moved on a small region basis in accordance with an instruction inputted by the game player via an inputting unit, while the combat elements are combated with each other appropriately. This provides the game player enjoyment in working on a strategy of where the player's combat elements should be moved and where and which opponent combat element the player's combat element should be fought with. In other words, this kind of game is designed to display a map screen page like a chess board and combat elements like chess pieces on a display and repeat the combat between combat elements, providing the game player enjoyment in a combat deployment and the strategy in response to the deployment.

In the war simulation game, the combat between the combat elements is executed under control of a computer in general. For example, the following system is widely used in the war simulation game. Specifically, there has been widely used the system in which data of such as offense, defense, mobility and the like are preset for each combat element, and data of such as a characteristic of location where the combat is executed is added to the above preset data to perform a stochastic computation, whereby deciding a winner and a loser of the combat.

Such a system is favorable to the game player who enjoys the war simulation game whose content is solely narrowed down to the strategic part since immediate judgment and a quick operation of input means are not needed.

However, in these days of an oversupply of the war simulation games using this kind of system, it is necessary to develop an unprecedented game system to provide new enjoyment to the game player. For example, if it is possible to demand immediate judgment and a quick operation of inputting means of the game player, a war simulation game that can provide new enjoyment to the game player may be implemented.

SUMMARY OF THE INVENTION

It is therefore an object of the present invention to provide a technique for implementing a war simulation game that can provide new enjoyment to a game player by demanding immediate judgment and a quick operation of input means from a game player.

According to a first aspect of the present invention, there is provided a game apparatus for executing a war simulation game, comprising: a first generator for generating image data to display a normal state image on a preset display, which includes a map, at least one player's element, and at least one opponent's element, both elements being positioned on the map; a first controller for activating the first generator when operation data indicating an operation by a game player is sent to the first controller and controlling the first generator to generate the image data for the normal state image according to the operation data; a second generator for generating image data to display a combat state image on the preset display, which represents that one of the at least one player's element fights against one of the at least one opponent's element; a second controller for activating the second generator when the operation data is sent to the second controller and controlling the second generator to generate the image data in real time in response to the operation data; and a selector for receiving the operation data, determining whether or not the operation data satisfies a preset condition, and sending the operation data to either the first controller or the second controller in accordance with the determination.

Namely, the war simulation game executed by this game apparatus advances as switching the normal state and the combat state. The image displayed on the display in the combat state indicates that the player's combat element, which executes a combat in accordance with the operation content inputted by the game player, among the player's combat elements and the opponent's combat element fighting with the player's combat element are displayed in real time.

Consequently, according to this game apparatus, the player's combat element, which executes a combat in real time in accordance with the operation content inputted by the game player, can be displayed on the display. The war simulation game executed by this game apparatus provides enjoyment in both a purely intellectual and strategic game, which does not need immediate judgment and a quick operation of a control unit, at the normal time and a game, which requires reflexes necessary for immediate judgment and the quick operation of the control unit, at the combat time. This provides various enjoyments to the game player so as to increase entertainment value.

It may be arranged that the preset condition is whether the operation data includes an instruction that desired one of the at least one player's element should fight against desired one of the at least one opponent's element. Furthermore, it may be arranged that the selector sends the operation data to the second controller when the operation data satisfies the preset condition. In this case, the second controller may detect a distance between the desired player's element and the desired opponent's element according to the operation data, and control the second generator so that the displayed combat state image reflects the detected distance.

It may be arranged that the map of the normal state image comprises a plurality of areas, and each of the both elements is positioned in one of the plurality of areas respectively. In this case, the second controller may determine, according to the operation data, whether or not an area in which the desired player's element is positioned is adjacent to an area in which the desired opponent's element is positioned, and control the second generator so that the displayed combat state image represents the desired player's element to fight the desired opponent's element in short-range circumstance when the area in which the desired player's element is positioned is adjacent to the area in which the desired opponent's element is positioned, while the display combat state image represents the desired player's element to fight the desired opponent's element in long-range circumstance when the area in which the desired player's element is positioned is not adjacent to the area in which the desired opponent's element is positioned.

Each of areas (small regions) may have any shape. For example, they can be rectrangularly or hexagonally shaped.

Consequently, it is possible to provide a predetermined relation between two states, that is, the normal state and the combat state to be executed as being switched by the war simulation game of this game apparatus. The provision of the element of the normal state as an element exerting influence upon the combat state makes it possible to more deepen the strategy that is required in the normal state.

The situation about the distance between the player's combat element and the opponent's combat element at the time of changing the normal state to the combat state is handed over to the game executed in the combat state. This is one of the variations that can provide relations between the normal state and the combat state, and has a great value in the point that the player's intuitive power can be used.

According to a second aspect of the present invention, there is provided a method of executing a war simulation game on a game apparatus, comprising: a first generating step of generating image data to display a normal state image on a preset display of the game apparatus, which includes a map, at least one player's element, and at least one opponent's element, both elements being positioned on the map; a first controlling step of activating the first generating step in response to reception operation data indicating an operation by a game player and controlling the first generating step to generate the image data for the normal state image according to the operation data; a second generating step of generating image data to display a combat state image on the preset display, which represents that one of the at least one player's element fights against one of the at least one opponent's element; a second controlling step of activating the second generating step in response to reception of the operation data and controlling the second generating step to generate the image data in real time in response to the operation data; and a selecting step of receiving the operation data, determining whether or not the operation data satisfies a preset condition, and sending the operation data to either the first controlling step or the second controlling step in accordance with the determination.

According to a third aspect of the present invention, there is provided a storage medium having computer readable program code means embodied in the medium, the computer readable program code means comprising: first computer readable program code means for generating image data to display a normal state image on a preset display, which includes a map, at least one player's element, and at least one opponent's element, both elements being positioned on the map; second computer readable program code means for activating the first computer readable program code means in response to reception operation data indicating an operation by a game player and controlling the first computer readable program code means to generate the image data for the normal state image according to the operation data; third computer readable program code means for generating image data to display a combat state image on the preset display, which represents that one of the at least one player's element fights against one of the at least one opponent's element; fourth computer readable program code means for activating the third computer readable program code means in response to reception of the operation data and controlling the third computer readable program code means to generate the image data in real time in response to the operation data; and fifth computer readable program code means for receiving the operation data, determining whether or not the operation data satisfies a preset condition, and sending the operation data to either the second computer readable program code means or the fourth computer readable program code means in accordance with the determination.

According to a fourth aspect of the present invention, there is provided a computer program for a computer having a display, the computer program causing the computer to execute the steps of: a first generating step of generating image data to display a normal state image on the display of the game apparatus, which includes a map, at least one player's element, and at least one opponent's element, both elements being positioned on the map; a first controlling step of activating the first generating step in response to reception operation data indicating an operation by a game player and controlling the first generating step to generate the image data for the normal state image according to the operation data; a second generating step of generating image data to display a combat state image on the display, which represents that one of the at least one player's element fights against one of the at least one opponent's element; a second controlling step of activating the second generating step in response to reception of the operation data and controlling the second generating step to generate the image data in real time in response to the operation data; and a selecting step of receiving the operation data, determining whether or not the operation data satisfies a preset condition, and sending the operation data to either the first controlling step or the second controlling step in accordance with the determination.

In the fourth aspect, the computer program may be in a computer readable storage medium.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A preferred embodiment of the present invention will be specifically described with reference to the accompanying drawings.

Figure 1:
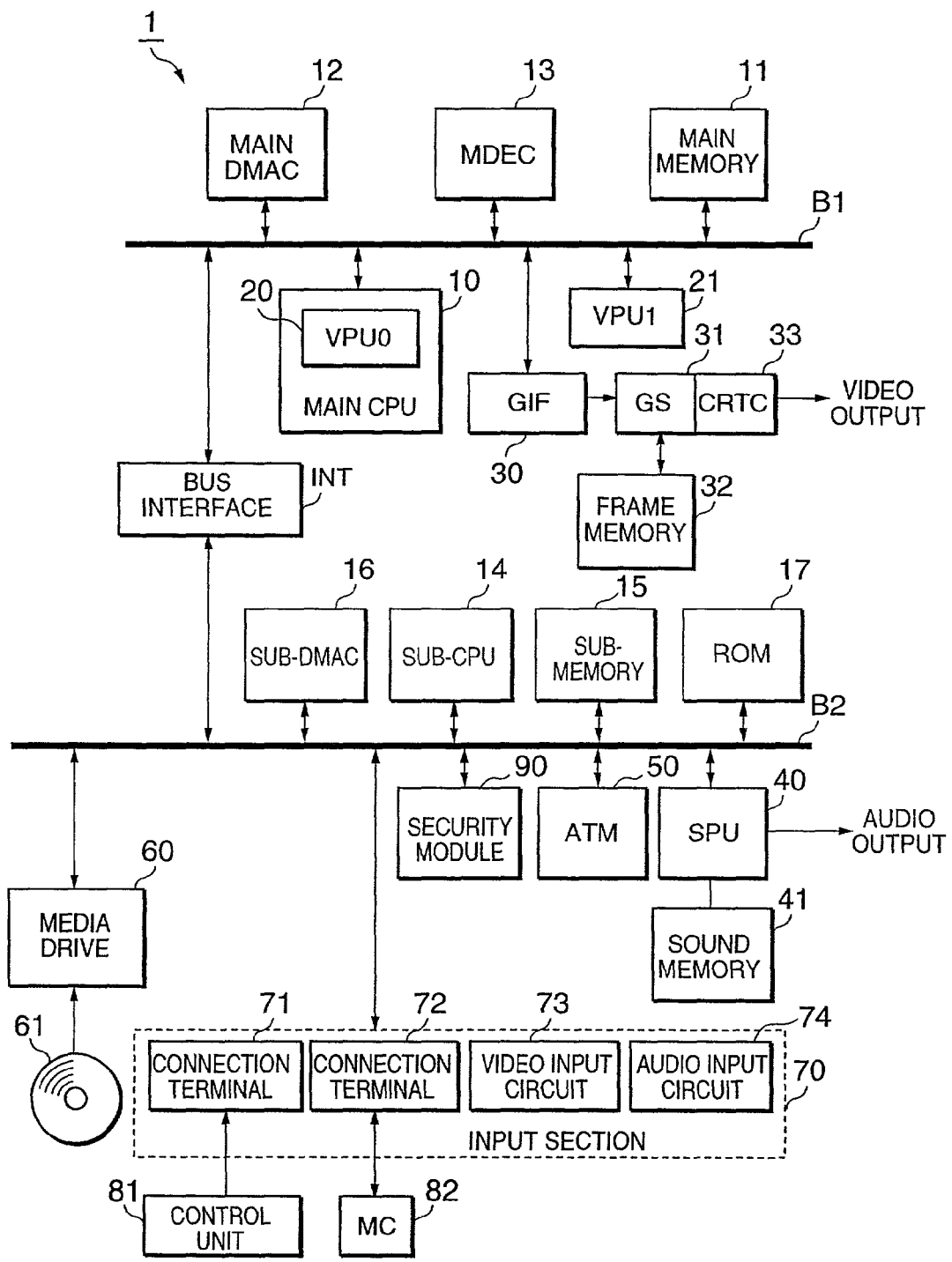
FIG. 1 is a hardware configuration view illustrating an example of a game apparatus main body to which the present invention is applied.

A game apparatus of the present invention will be first explained. The game apparatus of the present invention is implemented as a game apparatus having hardware configured as illustrated in FIG. 1.

A game apparatus main body 2 has two buses of a main bus B1 and a sub-bus B2 as illustrated in the figure. These buses B1 and B2 are connected or disconnected to/from each other via a bus interface INT.

A main CPU (Central Processing Unit) 10, which is composed of a microprocessor, a first vector processing unit (VPU0, hereinafter referred to as "first VPU") 20, a main memory 11 having a RAM (Random Access Memory), a main DMAC (Direct Memory Access Controller) 12, an MPEG (Moving Picture Experts Group) decoder (MDEC) 13, a second vector processing unit (VPU1, hereinafter referred to as "second VPU") 12, and a GIF (Graphical Synthesizer-interface) 30, which functions as an arbiter for the first and second VPUs 20 and 21, are connected to the main bus B1. Moreover, a graphical synthesizer (hereinafter referred to as "GS") 31 is connected thereto via the GIF 30. A CRTC (CRT controller) 33 for generating a video output signal is connected to the GS31.

Though the CRTC is connected to a predetermined display unit for displaying a game image, the illustration of this display unit is omitted.

The main CPU 10 reads in an activation program from a ROM 17 on the sub-bus B2 via the bus interface INT at a game apparatus start-up time, and executes the activation program to operate an operating system. The main CPU 10 also controls a media drive 60 to read out an application program and data from a media 61 to store them to the main memory 11. Moreover, the main CPU 10 performs geometry processing with respect to various kinds of data read from the media 61, for example, three-dimensional object data (coordinate values of vertices (representative points) of polygons) composed of a plurality of basic graphics (polygons) in cooperation with the first VPU 20.

Additionally, in the main CPU 10, there is provided a high-speed memory, which is referred to as SPR (Scratch Pad RAM), for temporarily storing the result of processing in cooperation with the first VPU 20.

The first VPU 20 has a plurality of operators to carry out an operation of a real number of floating-point arithmetic. The first VPU 20 performs floating-point arithmetic in parallel using these operators. Namely, the main CPU 10 and first VPU 20 perform arithmetic processing, which requires a precise operation on a polygon basis, among geometry processing. Then, they generate a display list having polygon definition information as its content such as a vertex coordinate sequence, shading mode information and so on obtained by this processing.

Polygon definition information is composed of drawing region setting information and polygon information. Drawing region setting information is made up of an offset coordinate at a frame buffer address of the drawing region and a coordinate of a drawing clipping region to cancel the drawing when a polygon coordinate is placed at the outside of the drawing region. Polygon information is composed of polygon attribute information and vertex information. Polygon attribute information is information for specifying a shading mode, an $\alpha$ blending mode, and a texture mapping mode. Vertex information includes a vertex drawing inner region coordinate, a vertex texture inner region coordinate and a vertex color, etc.

As is the case with the first VPU 20, the second VPU 21 has a plurality of operators to carry out an operation of a real number of floating-point arithmetic. The second VPU 21 performs floating-point arithmetic in parallel using these operators. Then, the second VPU 21 generates a display list having an image generated by an operation of a control unit 81 and an operation of a matrix, e.g., relatively easy two-dimensional polygon definition information as its content, which can be generated by processing of, e.g., perspective conversion with respect to a simple-shaped object such as a building, a car, etc., a parallel light source calculation, generation of a two-dimensional curvature, and so on.

Though the first VPU 20 and second VPU 21 have the same configuration, they function as a geometry engine that starts arithmetic processing with a different content. Normally, processing (non-fixed geometry processing) for character movement, which needs a complicated behavior calculation, is assigned to the first VPU 20. Then, processing (fixed geometry processing) for an object, which is simple but needs numerous polygons, for example, a background building and the like, is assigned to the second VPU 21.

The first VPU 20 performs macro arithmetic processing to be synchronized with a video rate, and the second VPU 21 is designed to operate in synchronization with the GS31. For this purpose, the second VPU 21 is equipped with a direct path directly connecting to the GS31. Conversely, the first VPU 20 is closely connected to a microprocessor provided in the main CPU 10 to facilitate programming of complicated processing.

The first VPU 20 and second VPU 21 generate the display lists. The generated display lists are transferred to the GS31 via the GIF 30.

The GIF 30 performs arbitration to prevent occurrence of a collision at the time of transferring the display lists generated by the first VPU 20 and second VPU 21 to the GS31. In this embodiment, however, a function of checking these display lists in order of priority to transfer them to the GS31 from the higher display list is added to the GIF 30. Information indicating priority of the display lists is generally described in its tag region when the VPUs 20 and 21 generate display lists, but the GIF may determine the priority originally.

The GS31 holds drawing contexts. The GS31 reads the corresponding drawing context based on identification information of image contexts included in the display lists notified from the GIF 30. Then, the GS31 performs rendering processing by use of the read drawing context to draw a polygon in a frame memory 32. The frame memory 32 can be used as a texture memory, so that a pixel image on the frame memory is also used as a texture to be adhered onto a polygon to be drawn.

Referring back to FIG. 1, the main DMAC 12 provides DMA transfer control to the respective circuits connected to the main bus B1, while provides DMA transfer control to the respective circuits connected to the sub-bus B2 in accordance with the state of bus interface INT.

The MDEC 13 operates concurrently with the main CPU 10, and decompresses data compressed in MPEG (Moving Picture Experts) or JPEG (Joint Photographic Experts Group).

A sub-CPU 14 comprising a microprocessor and so on, a sub-memory 15 having a RAM, a sub-DMAC 16, a ROM 17 having a program such as an operating system and the like stored therein, a sound processing unit (SPU) 40 that reads sound data stored in a sound memory 59 to output as an audio output, a communication controller (ATM) 50 that performs data transmission/reception via a public switched telephone network, a media drive 60 for attaching a recording medium 61 such as a CD-ROM and DVD-ROM, and an input unit 70 are connected to the sub-bus B2. The input unit 70 includes a connection terminal 71 for connecting a control unit 81, a connection terminal 72 for connecting a memory card MC, a video input circuit 73 for inputting image data from an external unit, and an audio input circuit for inputting sound data from an external unit.

The control unit 81 corresponds to inputting means of the present invention.

The sound processing unit 40 is connected to a speaker (not shown) of the present invention to output effective sounds.

The sub-CPU 14 performs various kinds of operations in accordance with a program stored in the ROM. The sub-DMAC 16 provides the DMA transfer control to the respective circuits connected to the sub-bus B2 only when the main bas B1 and sub-bus B2 are separated from each other by the bus interface INT.

The game apparatus of this embodiment also performs characteristic geometry processing. As mentioned above, the concurrent operation of first VPU 20 and second VPU 21 makes it possible to perform geometry processing, which is adaptable to high-speed rendering processing. Hereinafter, as to whether the result of arithmetic processing obtained by the first VPU 20 is directly sent to the GIF 30 or serially sent thereto via the second VPU 21, the selection is designed to be performed by software. The former mode is referred to as a parallel connection and the latter mode is referred to as a serial connection. In either case, the output of second VPU 21 has a path directly connected to the GIF 30 (GS31) and performs a coordinate conversion in synchronization with timing of rendering processing of the GS31. As a result, the standby state of GS31 is not maintained more than necessary.

In the above-arranged game apparatus, when the recording medium 61 of the present invention having, for example, a CD-ROM is attached to the disk drive 41 and power is turned on or reset processing is performed, the main CPU 10 executes OS recorded in the ROM 17. When OS is executed, the main CPU 10 initializes the entirety of the apparatus to confirm the operation and the like and controls the disk controller 40 to execute a game program recorded in a CD-ROM 44 after reading it to the main memory 13. The execution of this game program allows the main CPU 10 to form the function block shown in FIG. 2 and to implement the game apparatus 2 of the present invention.

Figure 2:
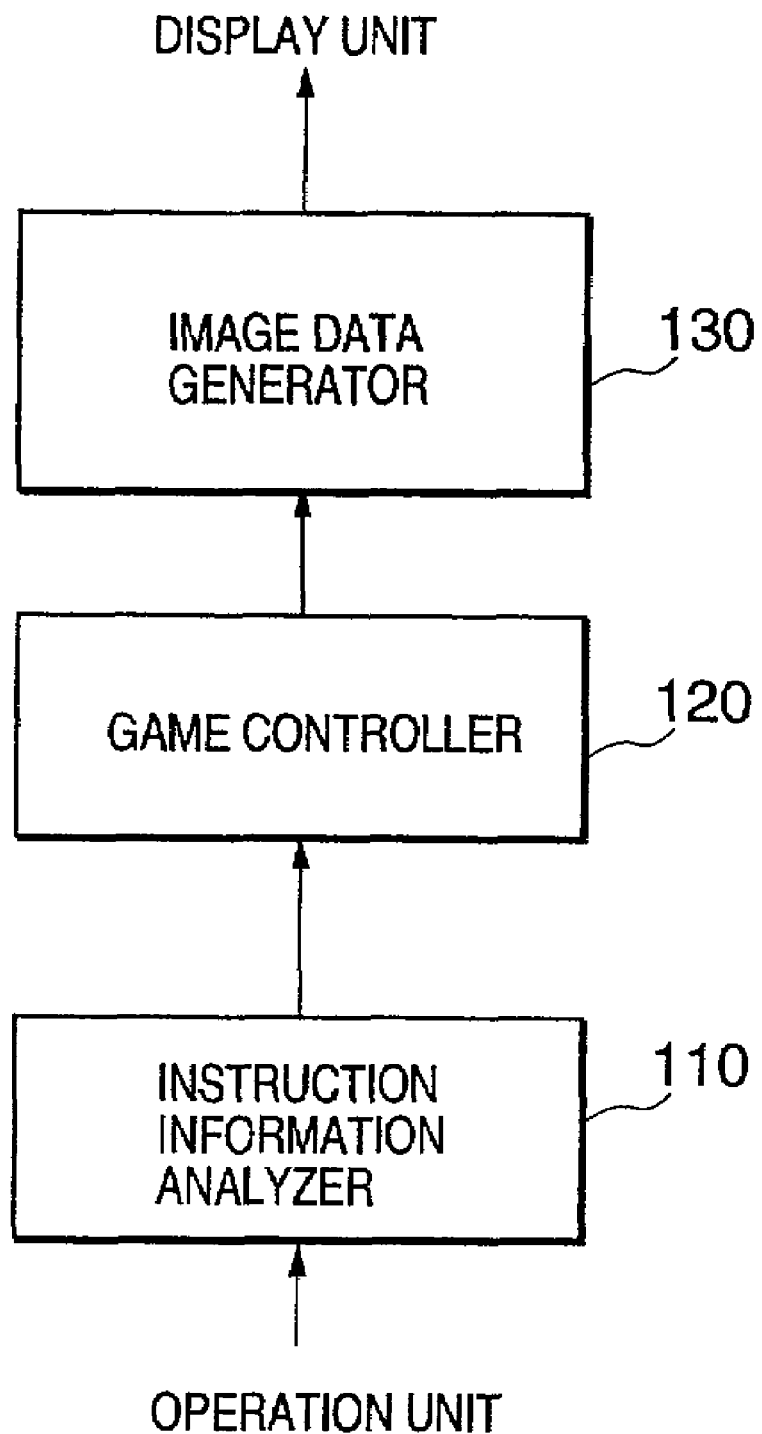
FIG. 2 is a function block diagram illustrating a configuration example of a game apparatus according to a first embodiment of the present invention.

As illustrated in FIG. 2, the game apparatus of this embodiment comprises an instruction information analyzer 110, a game controller 120, and an image data generator 130.

The instruction information analyzer 110 is connected to the control unit 81, and determines the operation content inputted from the control unit 81 by the game player. The operation content analyzed by the instruction information analyzer 110 is sent to the game controller 120 to be reflected in control of executing the game.

The game controller 120 integrally controls the entirety of game to be executed by the present invention, and corresponds to control means of the present invention.

In addition, the game executed by the game apparatus of the present invention is a war simulation game. The war simulation game to be executed by this game apparatus can be described as follows:

A map image of a map, which is divided into rectangular small regions formed in a matrix, is displayed on the display unit and combat elements, which fight with each other, are displayed on some small regions so that the combat is deployed as moving the combat elements appropriately in accordance with instructions from the game player. This war simulation game is executed by alternately repeating a normal state and a combat state wherein the normal state indicates that movement of the combat elements is performed and the combat state indicates that the combat elements fight with each other in the normal state.

Figure 3:
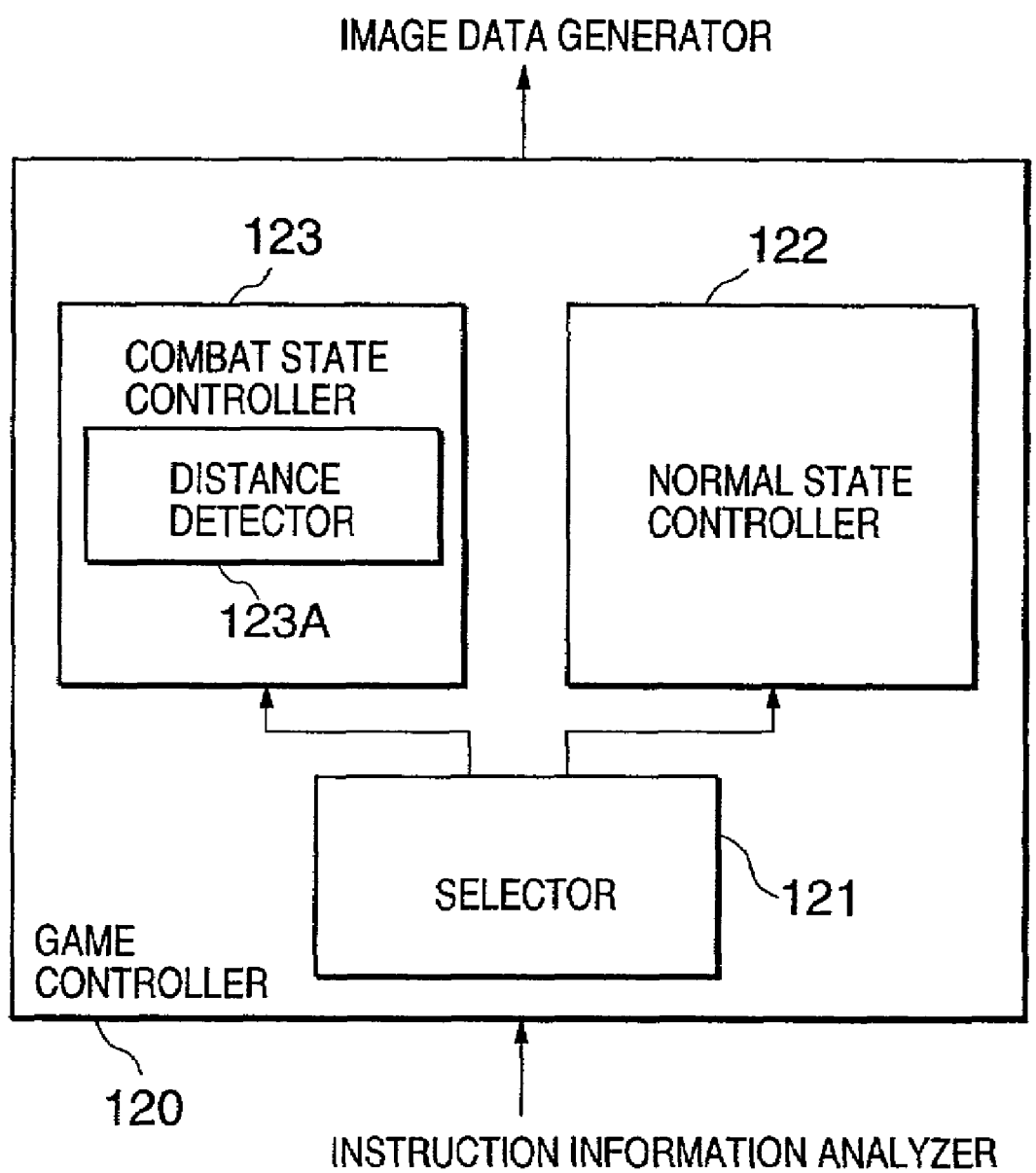
FIG. 3 is a function block diagram illustrating a configuration of a game controller shown in FIG. 2.

The game controller 120 comprises a selector 121, a normal state controller 122, and a combat state controller 123 as shown in FIG. 3.

The selector 121 selects the normal state or combat state in accordance with the operation content inputted by the game player via the control unit 81. Then the selector 121 sends data outputted from the instruction information analyzer 110 to the normal state controller 122 or the combat state controller 123 according to the selection.

The normal state controller 122 performs control in the normal state. The combat state controller 123 performs control in the combat state. Data of each of the normal state controller 122 and the combat state controller 123 is sent to an image data generator 130 to be described later to be reflected in generation of an image to be displayed on the display unit.

The combat state controller 123 comprises a distance detector 123A, which corresponds to distance detecting means of the present invention. The distance detector 123A is capable of receiving data from the selector 121. At the time of receiving the data, the distance detector 123A detects a distance between the player's combat element to execute the combat according to the player's operation content inputted by the game player among the player's combat elements and the opponent's combat element fighting with the player's combat element, whereby generating distance data of the corresponding distance. The generated distance data is sent to the image generator 130.

The image data generator 130 generates image data to display a desired image on the display unit. The display unit displays an image based on this image data. This image data generator 130 corresponds to image data generating means of the present invention.

Figure 4:
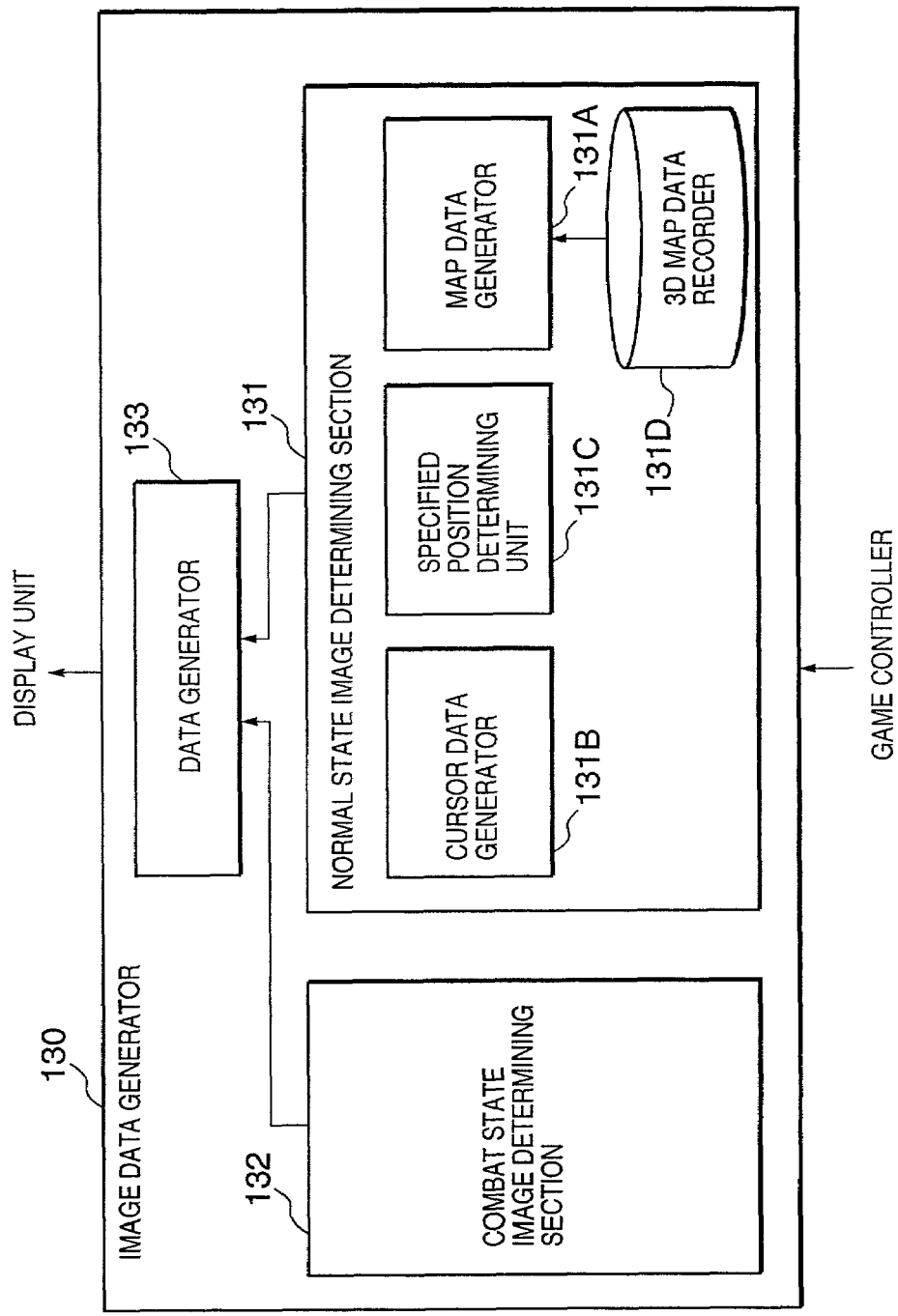
FIG. 4 is a function block diagram illustrating a configuration of an image generator shown in FIG. 2.

The image data generator 130 comprises a normal state image determining unit 131, a combat state image determining unit 132, and a data generator 133 as shown in FIG. 4. The normal state image determining unit 131 determines an image to be displayed on the display unit in the normal state. The combat state image determining unit 132 determines an image to be displayed on the display unit in the combat state. The data generator 133 generates final image data based on data, which is indicative of the image to be displayed on the display unit and which is sent from either the normal state image determining section 131 or the combat state image determining section 132.

The normal state image determining section 131 includes a map data generator 131A, a cursor data generator 131B, a specified position determining unit 131C and a 3D map data recorder 131D.

The 3D map data recorder 131D records 3D map data. This 3D map data is data of a map, which includes three-dimensional information and which is used to generate map data about a display map to be display on the display unit in the normal state. The 3D map data is designed to generate such a display map that is divided into small square regions formed in a matrix though data is not limited to this.

The map data generating section 131A generates map data about a two-dimensional display map to be displayed on the display unit based on 3D map data read from the 3D map data recording section 131D. The map data is sent to the data generator 133.

The map data generator 131 also generates combat element data for displaying the player's combat element and the opponent's combat element on the display wherein the player's combat element moves based on the operation content inputted by the gamer player via the control unit 81 and the opponent's combat element moves automatically upon receipt of control of predetermined data. It is noted that the opponent's combat element may execute movement and combat automatically under control of the game controller 120 or based on the operation content inputted by the other player.

The combat element described herein indicates one that is movable on the 3D map and fights with an enemy combat element. For example, the combat element is expressed as a tank, a flat land, a foot soldier, etc., depending on the kinds of war simulation games.

The cursor data generator 131B displays a two-dimensional cursor at a predetermined position on the screen based on the operation content inputted by the player via the control unit 81. The cursor data generator 131B generates cursor data for displaying the cursor on the screen. The data is sent to the data generator 133.

The specified position determining unit 131C determines a position on the 3D map specified by the cursor. Position data about the position specified by the cursor is sent to the data generator 133.

The combat state image determining unit 132 determines an image to be displayed on the display in the combat state. Specifically, the combat state image determining unit 132 determines what image should be displayed on the display based on data generated by the combat state controller 123.

Figure 5:
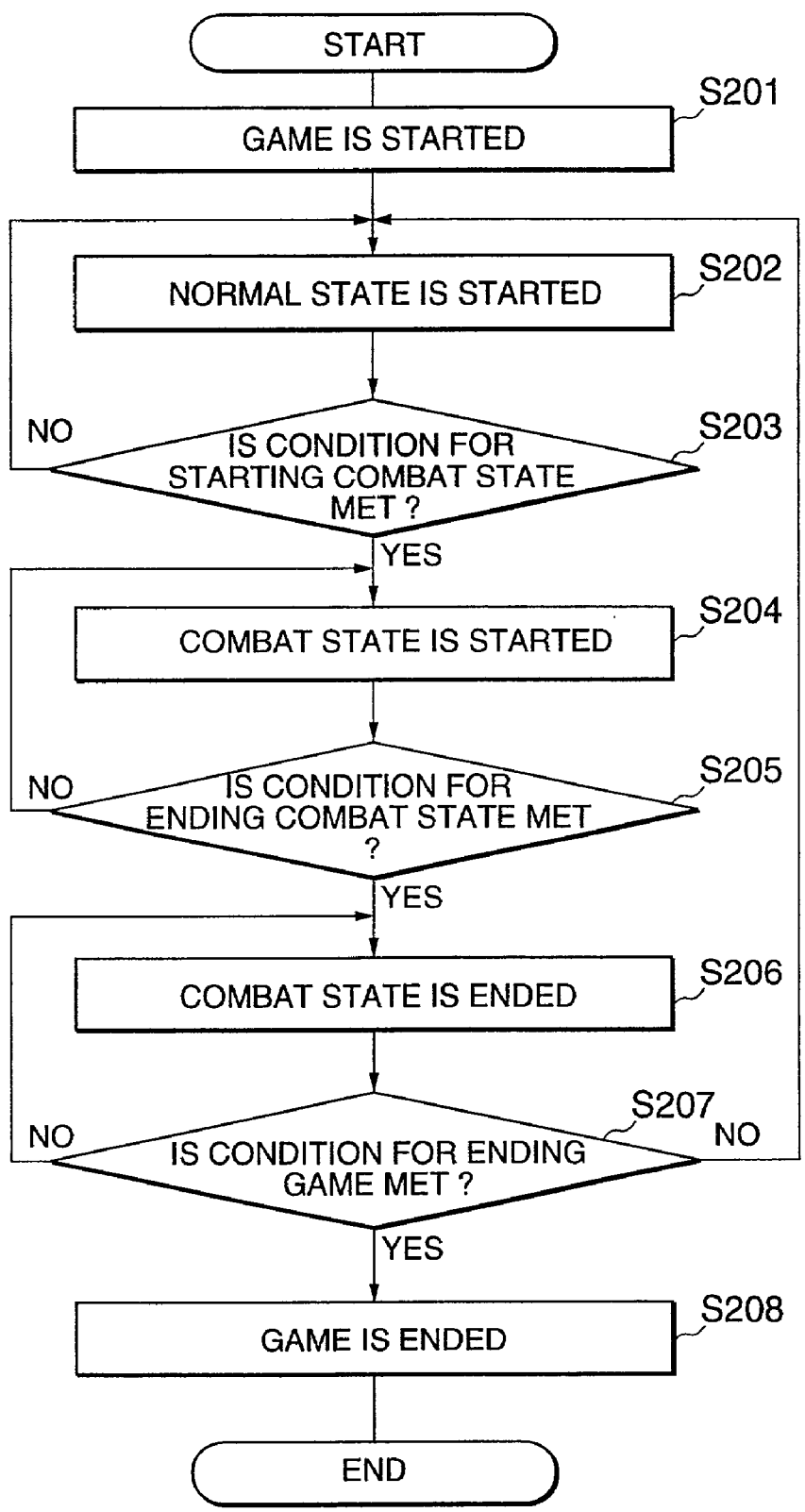
FIG. 5 is a flowchart of a cursor position determining method of this embodiment.

Actions of the game apparatus of this embodiment will be next explained in connection with one embodiment of the specified position determining method according to the present invention. This game apparatus executes the specified position determining method of the present invention with a flow shown by FIG. 5.

Power source is turned on or reset processing is performed, and the game player inputs the operation content of the game start via the control unit 81, whereby the game apparatus starts a war simulation game (S201).

When the game is started, the normal state is initiated (S202), so that the screen page of the normal state is displayed on the display unit. Namely, the selector 121 selects the normal state in an initial state.

On the screen page of the normal state, the display map, which expresses the 3D map two-dimensionally, the player's combat elements, the opponent's combat elements, and the cursor are displayed. An example of the image displayed on the display unit at this time is illustrated in FIG. 6.

The display map, combat elements, and cursor are displayed as follows:

Specifically, the map data generator 131A reads 3D data map including three-dimensional data including three-dimensional data from the 3D map data recorder 131D, and converts it to map data about two-dimensional display map, whereby generating the display map.

Figure 6:
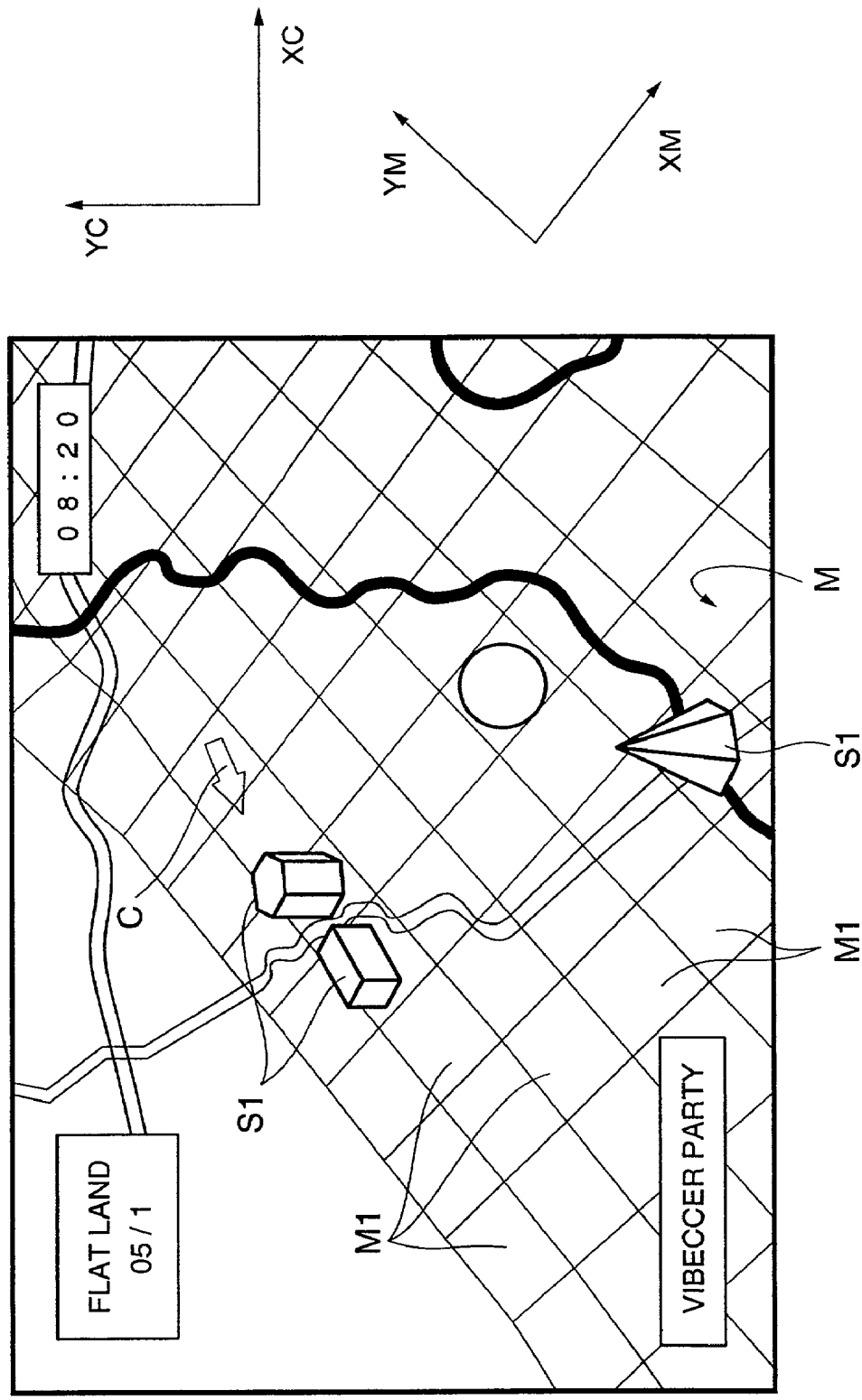
FIG. 6 is a view illustrating one example of an image displayed on a display unit in a normal state.

A display map M is as shown in FIG. 6. Namely, the display map M is divided into square small regions M1, M1, . . . in a matrix form. In this example, different geographical features such as a flat ground, a river, a mountainous district, and the like are given to the respective small regions M1, M1, . . . These features exert an influence upon the result of combat at each of the small regions M1, M1, . . . That is, the combat elements S1, S1, . . . have intrinsic properties, respectively, and advantageous small regions M1, M1, . . . and disadvantageous regions M1, M1, . . . are predetermined. The game player works out a strategy of movement of each of player's combat elements S1, S1, . . . with consideration given to such geographical features.

These combat elements S1, S1, . . . are designed to move in accordance with data generated by the instruction information analyzer 110 based on the operation content inputted by the player via the control unit 81. The map data generator 131A generates combat element data for displaying the respective combat elements S1, S1, . . . on the display unit based on data generated by the instruction information analyzer 110 under the normal state controller 122.

It is noted that the respective combat elements S1, S1, . . . are designed to move in the unit of small regions M1, M1, . . . as a minimum unit. The opponent's combat elements M1, M1 . . . move in the unit of small regions M1, M1 . . . under the normal state controller 122, and the player's combat elements are designed to move to the small regions M1, M1, . . . , which the player has specified with the cursor C.

The cursor C is displayed based on cursor data generated by the cursor data generator 131B. The cursor data originally has only two-dimensional information and is expressed two-dimensionally.

The cursor data is generated by the cursor data generator 131B based on the operation content inputted by the game player via the control unit 81. In accordance with the instructions of movement in upper and lower and right and left directions inputted by the game player using the controller, the cursor C is controlled to be moved to the corresponding direction. Data necessary for this control is inputted to the cursor data generator 131B via the control unit 81, the instruction information analyzer 110, and the normal state controller 122.

Axes in the upper and lower and right and left directions where the cursor C moves are directions indicated by XC and XY in the figure, and they deviate from axes XM and YM in the upper and lower and right and left directions about the display map M. Namely, the moving direction of the cursor C is controlled regardless of the axes XM and YM in the upper and lower and right and left directions on the display map M.

In the normal state, it is also determined as to which position on the 3D map the cursor C specifies. Namely, when the game player moves the player's combat elements S1, S1, . . . , small regions M1, M1, . . . , must be specified by the cursor C. Accordingly, the specified position determining unit 13 IC determines the position on the 3D map, which the cursor C specifies, by the way set forth below.

The specified position determining unit 131 C determines not only the position on the 3D map specified by the cursor C but also which small region M1 the cursor C specifies.

Figure 7:
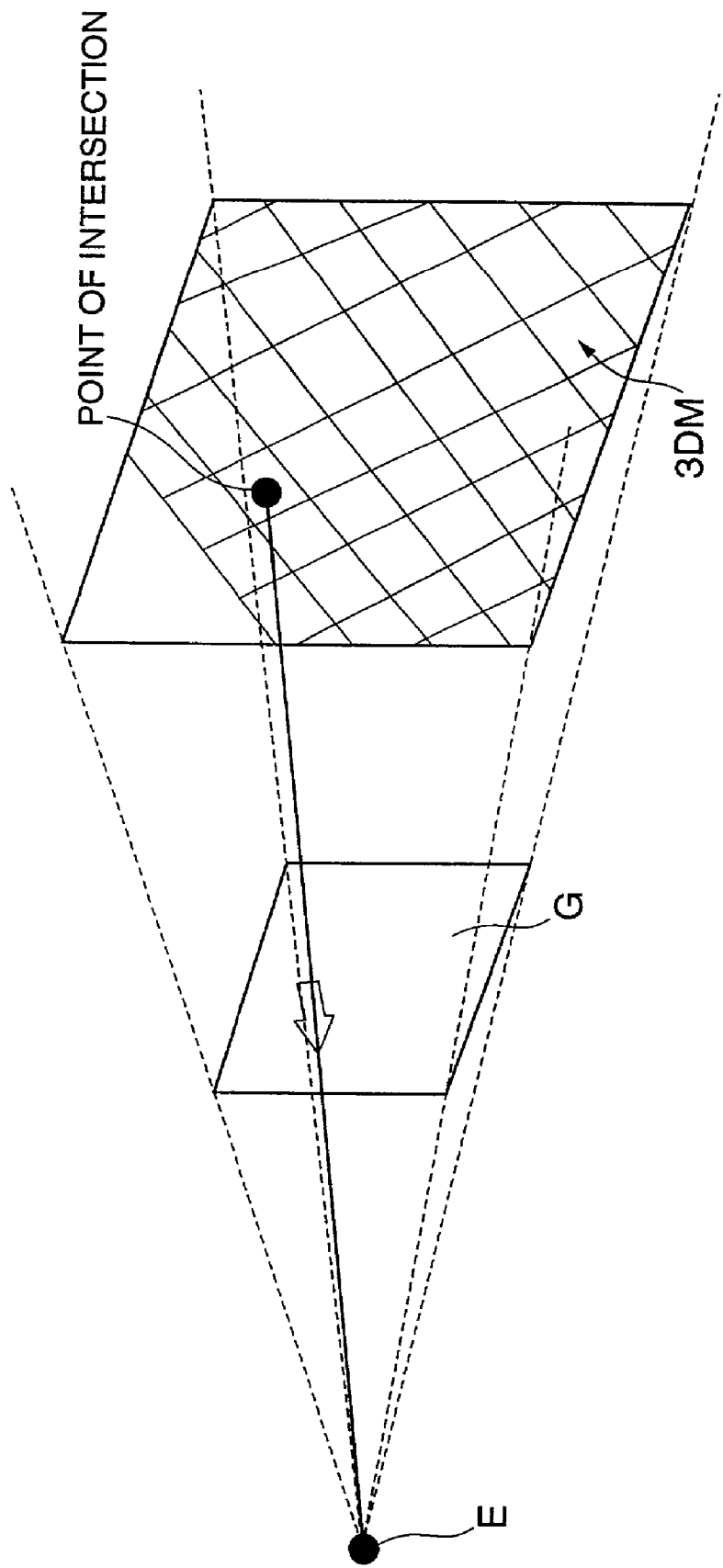
FIG. 7 is a view conceptually illustrating an outline of a cursor position determining method of this embodiment.

This determination is performed by the method as shown in FIG. 7. It is noted that FIG. 7 schematically and conceptually shows this determination method.

According to this method, an image G, which is displayed on the display unit, and a predetermined viewpoint E, which is placed in front of the image G are imaginarily formed. Next, a rectangular 3D map 3DM with its four corners is imaginarily formed on straight lines passing through four corners of the image G. It is assumed that the 3D map 3DM is placed to be parallel with the image G at a backward position seeing from the viewpoint E of the image G. This 3D map corresponds to the display map displayed on the display unit. At this time, the specified position determining unit 131C uses, for example, 3D map data obtained from the 3D map recorder 131D via the map data generator 131A in order to form the 3D map 3D imaginarily.

Then, in this state, a straight line passing through the viewpoint E and a predetermined position of the cursor C (e.g., top portion of the cursor C indicated by an arrow shape) is imaginarily formed. Next, it is detected at which position on 3D map 3DM the straight line intersects. After that, it is also detected in which small region M1 a point of intersection exists. This detects with which small region M1 the cursor C has a point of intersection.

Then, by fixing that the cursor C specifies the small region M1 where the point of intersection exists, it is determined which small region M1 the cursor C specifies.

In this embodiment, data of which small region M1 the cursor C specifies is sent to the map data generator 131A. As a result, the map data generator 131A uses the above data in generating combat element data after deciding destinations of combat elements S1, S1.

The above data can be used as follows though this is not always needed.

Specifically, the above data can be used to generate image data for displaying a small region S1 specified by the cursor C at the current point on the display unit as distinguished from other small regions S1, S1, . . . This can be attained by, for example, making a difference in color between the small region S1 and other regions S1, S1 . . . or adding some pattern to the small region S1 though the illustration is omitted. Data generated in this case is capable of displaying such a color and a pattern.

The image displayed on the display unit in the normal state is displayed based on image data generated when the data generator 133 combines map data, combat element data and cursor data generated as mentioned above.

In the normal state, a determination whether or not a predetermined condition about the start of combat is satisfied is performed (S203). For example, this condition is satisfied when the game player inputs the operation content, which corresponds to the instructions in which the predetermined player's combat elements S1, S1 are fought with the opponent's combat elements S1, S1, via the control unit 81 or when the normal state controller 122 supports the start of combat in accordance with the predetermined condition. The determination whether or not this condition is satisfied is performed by, for example, the selector 121.

When this condition is satisfied (S203: YES), the selector 121 sends data which is outputted from the instruction information analyzer 110, to the combat state controller 121. The combat state controller 121 receives it and starts to control the combat state, so that the combat state is started (S204). When the condition is not satisfied (S203: NO), the normal state is continued.

When the combat state is started, an image, which shows a situation in which the player's combat element S1 and the opponent's combat element S2 are fighting with each other, is displayed on the display unit in real time.

Figure 8:
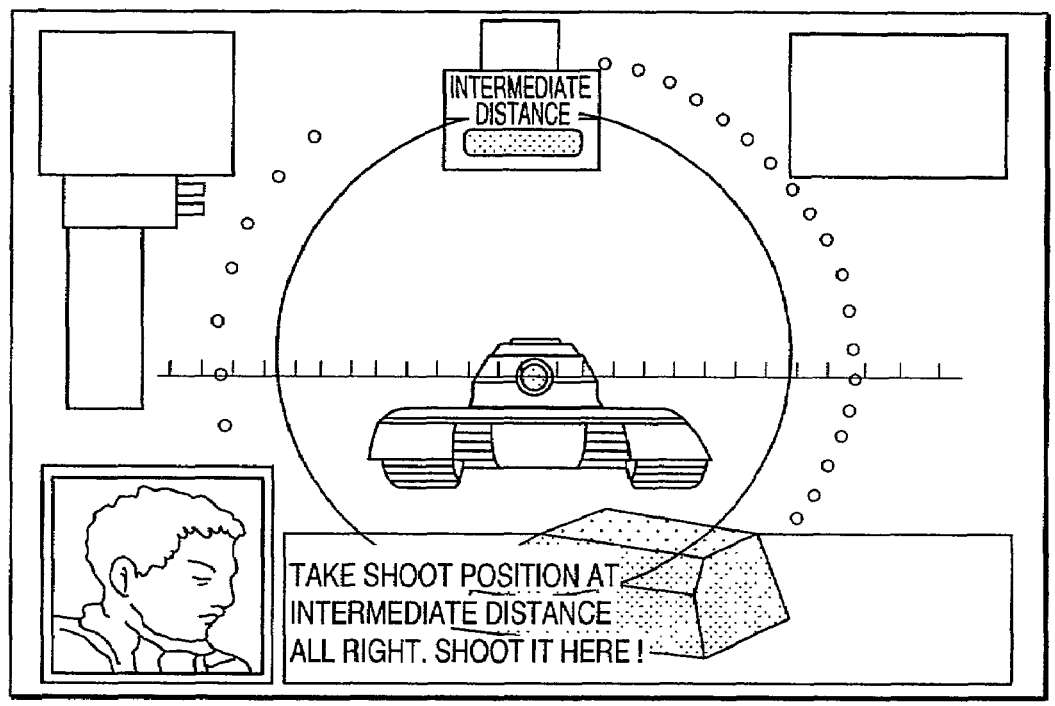
FIG. 8 is a view illustrating one example of an image displayed on a display unit in a combat state.

This image is displayed on the display unit in accordance with image data, which the data generator 133 has generated based on data determined by the combat state image determining unit 132 under control of the combat state controller 123. This image shows that the player's combat element executes an action in real time in accordance with the operation content inputted by the game player. Accordingly, the data generator 133 generates combat image data to display the player's combat element S1, which executes a combat in accordance with the operation content inputted by the game player among the player's combat elements S1, S1, and the opponent's combat element S1 fighting with the player's combat element S1 in real time. In other words, the player's combat element S1 is displayed on the screen in real time in accordance with the operation content inputted by the game player. For example, the image as a moving image using a polygon is displayed on the display unit. One example of the image displayed on the display unit in the combat state is illustrated in FIG. 8.

At the combat state starting time, the following processing is carried out, whereby determining an initial screen page at the beginning of the combat state.

First, when the condition for starting the combat state is met, the aforementioned combat data is inputted to the combat state controller 123. This data is also sent to the distance detector 123A provided in the combat state controller 123.

Upon receipt of this data, the distance detector 123A detects a distance between the player's combat element S1, which executes the combat, and the opponent's combat element S1 so as to generate distance data of the distance. This distance denotes, for example, a distance between both combat elements S1 on the 3D map 3DM.

Distance data may be one that is proportional to the distance between both combat elements S1. In this example, however, to simplify the explanation, two kinds of different distance data are generated depending on whether both combat elements S1, which are to fight with each other, are placed at the small regions M1 adjacent to each other via the side or at a different position. Namely, the distance detector 123A generates distance data indicating that both combat elements S1 are placed in a close distance range in the former case and in a long distance range in the latter case.

Figure 9:
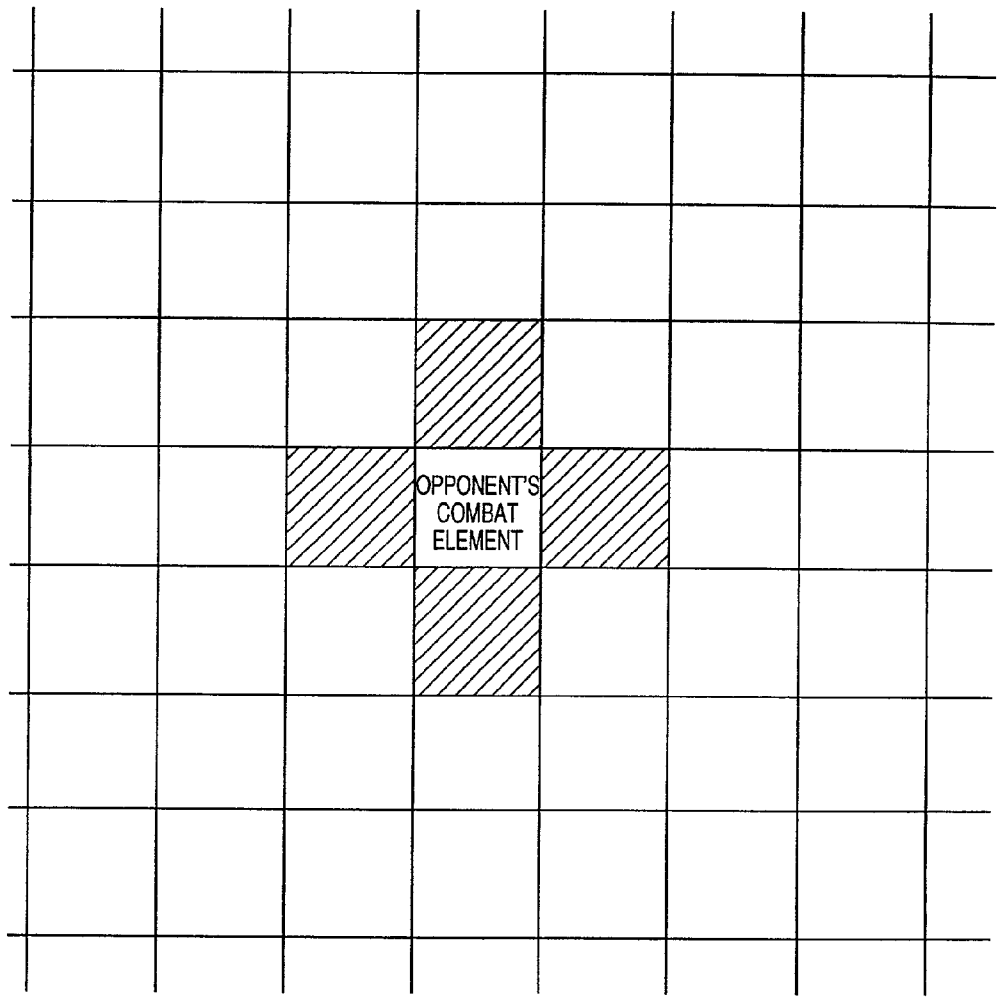
FIG. 9 is a view to explain a distance data generating method.

This can be explained with reference to FIG. 9. In this example, it is assumed that the opponent's combat element S1 is placed at the small region M1 as illustrated in the figure. Distance data indicating that both are in the close distance range is generated only when the player's combat elements are placed at four small regions shown by diagonal lines. When the player's combat elements are placed at the other regions, distance data indicating that both are in the long distance range is generated.

Then, this data is sent to the combat state image determining unit 132 provided in the image data generator 130. The combat state image determining unit 132 generates image data about the initial image displayed on the display unit in accordance with the distance data at the beginning of the change to the combat state. In this embodiment, when the combat state image determining unit 132 receives distance data indicating that both combat elements S1 are placed in the close distance range, the combat state image determining unit 132 is configured to generate initial image data for displaying the initial image indicating that both combat elements are in the close distance range as compared with the case in which it receives data indicating that both combat elements are in the long distance range.

Figure 10A:
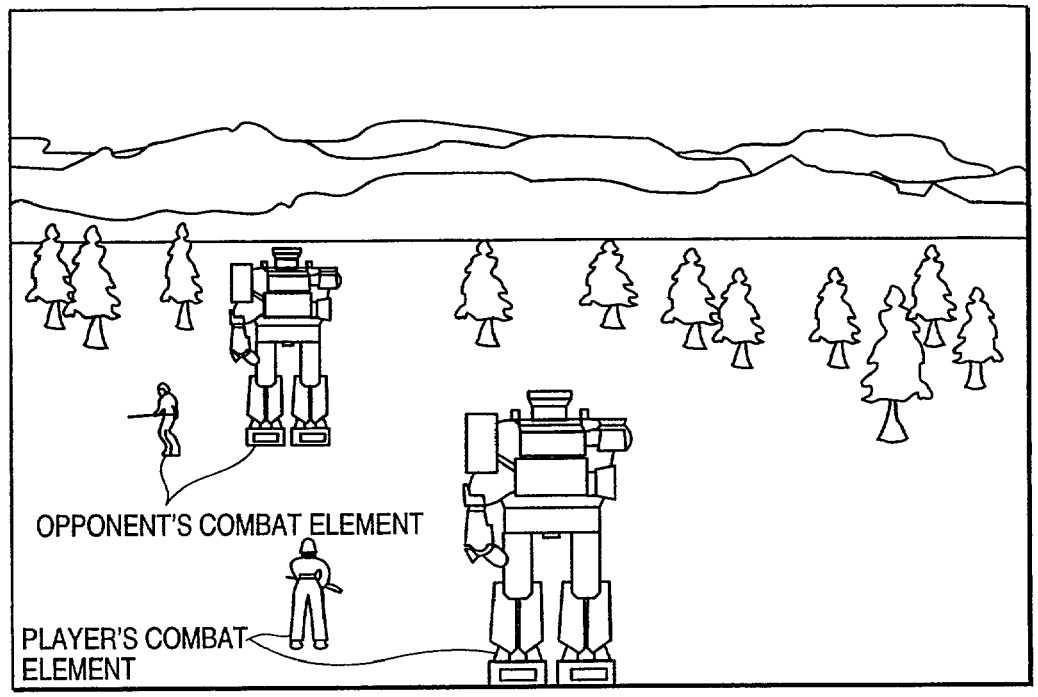
FIGS. 10A and 10B are views illustrating an example of an initial image displayed on a display unit at the beginning of a combat state.
Figure 10B:
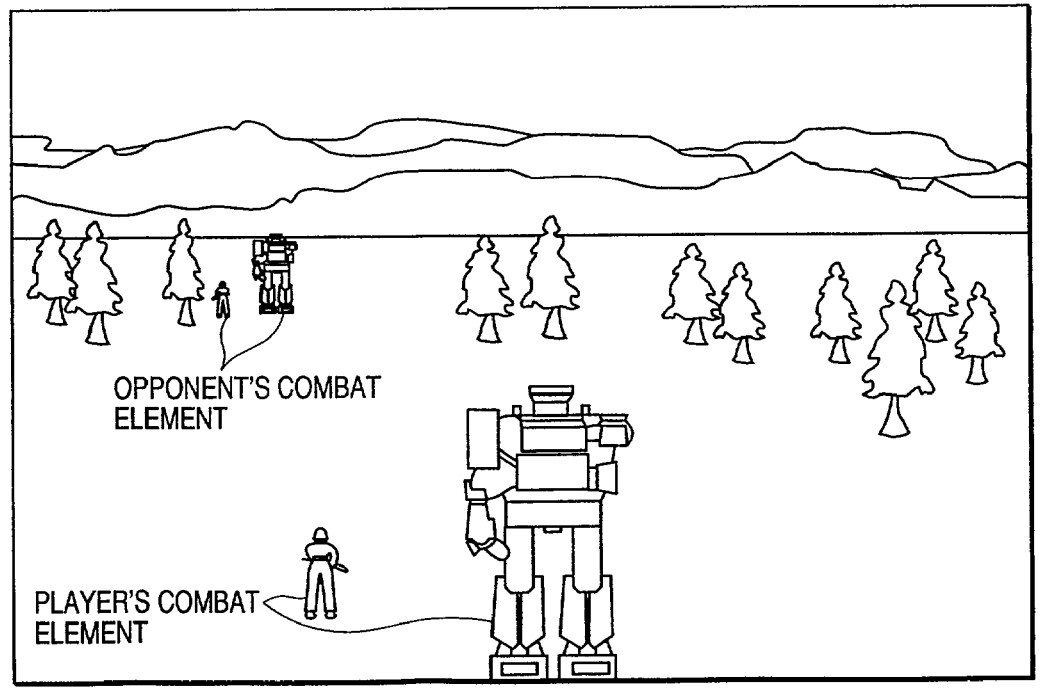

More specifically, this is illustrated as in FIGS. 10A and 10B. FIG. 10A shows an example of the initial image in a case in which the combat state image determining unit 132 receives distance data indicating that both combat elements S1 are placed in the close distance range. FIG. 10B shows an example of the initial image in a case the combat state image determining unit 132 receives data indicating that both combat elements are in the long distance range. In either example, the soldier displayed at the front indicates the player's combat element S1 and the solider displayed at the backward is the opponent's combat element S1.

According to these examples, in the case shown in FIG. 10A in which distance data indicates that both combat elements S1 are placed in the close distance range, the opponent's combat element S1 is displayed largely as compared with the case in FIG. 10B in which distance data indicates that both combat elements S1 are placed in the long distance range.

In a case where distance data is data that shows numerous levels (or non-level), which are proportional to the distance, the distance between the player's combat element S1 and the opponent's combat element S1 can be variously expressed.

In the combat state, it is judged whether or not a fixed condition about the end of combat is met (S205). For example, when either of the player's combat element S1 and the opponent's combat element S1, which are fighting with each other, is completely destroyed or annihilated, this condition can be met. The judgment whether this condition is met or not is performed by, for example, the selector 121.

When this condition is met (S205: YES), the combat state is ended. When the combat state is ended, the selector 121 performs switching from the combat state to the normal state so as to start the normal state (S206). When this condition is not met (S205: NO), the combat state is continued.

In the normal state, it is judged whether or not a fixed condition about the end of the game is met (S207). For example, when all player's combat elements S1 or opponent's combat elements S1 are completely destroyed or either the player or the computer acknowledge one's defeat, this condition can be met.

When this condition is met (S207: YES), the war simulation game is ended (S208). When the combat state is ended, an image indicating whether the player is a victor or a loser or an end roll is displayed on the display unit.

When this condition is not met (S207: NO), the war simulation game is continued.

As explained above, the present invention can add new interest, which results from an immediate judgment and a quick operation of input means, to the war simulation game whose enjoyment lies in mainly working on a strategy as thinking it over for a long time.

Moreover, the distance between the player's combat element and the opponent combat element at the time of changing the normal state to the combat state is reflected in the image on the initial screen page at the beginning of the combat state, making it possible to provide the game player a new element to be considered. This further increases enjoyment in the war simulation game.

Various embodiments and changes may be made thereunto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A game apparatus for executing a war simulation game, comprising:
    a first generator for generating image data to display a normal state image on a preset display, which includes a map, at least one player's element, and at least one opponent's element, both elements being positioned on the map;
    a first controller for activating the first generator when operation data indicating an operation by a game player is sent to the first controller and controlling the first generator to generate the image data for the normal state image according to the operation data;
    a second generator for generating image data to display a combat state image on the preset display, which represents that one of the at least one player's element fights against one of the at least one opponent's element;
    a second controller for activating the second generator when the operation data is sent to the second controller and controlling the second generator to generate the image data in real time in response to the operation data, wherein the real time generation of image data is free of a turn-based generation of image data; and
    a selector for receiving the operation data, determining whether or not the operation data satisfies a preset condition, and sending the operation data to either the first controller or the second controller in accordance with the determination
    wherein the map of the normal state image comprises a plurality of areas, and each of the both elements is positioned in one of the plurality of areas respectively,
    wherein the second controller determines, according to the operation data, whether or not an area in which the desired player's element is positioned is adjacent to an area in which the desired opponent's element is positioned, and controls the second generator so that the displayed combat state image represents the desired player's element to fight the desired opponent's element in short-range circumstance when the area in which the desired player's element is positioned is adjacent to the area in which the desired opponent's element is positioned, while the display combat state image represents the desired player's element to fight the desired opponent's element in long-range circumstance when the area in which the desired player's element is positioned is not adjacent to the area in which the desired opponent's element is positioned,
    wherein the map comprises a matrix form having a plurality of geographic features that exert an influence upon a result of combat between the at least one player's element and the at least one opponent's element,
    wherein the preset condition is whether the operation data includes an instruction that desired one of the at least one player's element should fight against desired one of the at least one opponent's element,
    wherein the selector sends the operation data to the second controller when the operation data satisfies the preset condition, and
    wherein the movements of the at least one player's element and the at least one opponent's element are influenced by the plurality of geographic features of the map.

2. The game apparatus according to claim 1, wherein the second controller detects a distance between the desired player's element and the desired opponent's element according to the operation data, and controls the second generator so that the displayed combat state image reflects the detected distance.

3. A method of executing a war simulation game on a game apparatus, comprising:
    a first generating step of generating image data to display a normal state image on a preset display of the game apparatus, which includes a map, at least one player's element and at least one opponent's element, both elements being positioned on the map;
    a first controlling step of activating the first generating step in response to reception operation data indicating an operation by a game player and controlling the first generating step to generate the image data for the normal state image according to the operation data;

a second generating step of generating image data to display a combat state image on the preset display, which represents that one of the at least one player's element fights against one of the at least one opponent's element;

a second controlling step of activating the second generating step in response to reception of the operation data and controlling the second generating step to generate the image data in real time in response to the operation data, wherein the real time generation of image data is free of a turn-based generation of image data; and a selecting step of receiving the operation data, determining whether or not the operation data satisfies a preset condition, and sending the operation data to either the first controlling step or the second controlling step in accordance with the determination, wherein the map of the normal state image comprises a plurality of areas having a plurality of geographic features, and each of the both elements is positioned in one of the plurality of areas respectively, and further comprising:

step of determining, according to the operation data, whether or not an area in which the desired player's element is positioned is adjacent to an area in which the desired opponent's element is positioned, and controlling the second generator so that the displayed combat state image represents the desired player's element to fight the desired opponent's element in short-range circumstance when the area in which the desired player's element is positioned is adjacent to the area in which the desired opponent's element is positioned, while the display combat state image represents the desired player's element to fight the desired opponent's element in long-range circumstance when the area in which the desired player's element is positioned is not adjacent to the area in which the desired opponent's element is positioned, wherein the plurality of geographic features exert an influence upon a result of combat between the at least one player's element and the at least one opponent's element, wherein the preset condition is whether the operation data includes an instruction that desired one of the at least one player's element should fight against desired one of the at least one opponent's element, wherein the selector sends the operation data to the second controller when the operation data satisfies the preset condition, and wherein the movements of the at least one player's element and the at least one opponent's element are influenced by the plurality of geographic features of the map.

4. A storage medium having computer readable program code means embodied in the medium, the computer readable program code means comprising:

first computer readable program code means for generating image data to display a normal state image on a preset display, which includes a map, at least one player's element, and at least one opponent's element, both elements being positioned on the map, wherein the map of the normal state image comprises a plurality of areas having a plurality of geographic features, and each of the both elements is positioned in one of the plurality of areas respectively;

second computer readable program code means for activating the first computer readable program code means in response to reception operation data indicating an operation by a game player and controlling the first computer readable program code means to generate the image data for the normal state image according to the operation data;

third computer readable program code means for generating image data to display a combat state image on the preset display, which represents that one of the at least one player's element fights against one of the at least one opponent's element;

fourth computer readable program code means for activating the third computer readable program code means in response to reception of the operation data and controlling the third computer readable program code means to generate the image data in real time in response to the operation data, wherein the real time generation of image data is free of a turn-based generation of image data; and fifth computer readable program code means for receiving the operation data, determining whether or not the operation data satisfies a preset condition, and sending the operation data to either the second computer readable program code means or the fourth computer readable program code means in accordance with the determination, and the computer readable program code means further comprising:

computer readable program code means for determining, according to the operation data, whether or not an area in which the desired player's element is positioned is adjacent to an area in which the desired opponent's element is positioned, and computer readable program code means for controlling the second generator so that the displayed combat state image represents the desired player's element to fight the desired opponent's element in short-range circumstance when the area in which the desired player's element is positioned is adjacent to the area in which the desired opponent's element is positioned, while the display combat state image represents the desired player's element to fight the desired opponent's element in long-range circumstance when the area in which the desired player's element is positioned is not adjacent to the area in which the desired opponent's element is positioned, and the plurality of geographic features exert an influence upon a result of combat between the at least one player's element the at least one opponent's element; and wherein the preset condition is whether the operation data includes an instruction that desired one of the at least one player's element should fight against desired one of the at least one opponent's element, wherein the fifth computer readable program code means sends the operation data to the fourth computer readable program code means when the operation data satisfies the preset condition, and wherein the movements of the at least one player's element and the at least one opponent's element are influenced by the plurality of geographic features of the map.

* * * * *

UNITED STATES PATENT AND TRADEMARK OFFICE
CERTIFICATE OF CORRECTION

PATENT NO. : 7,628,688 B2  Page 1 of 1
APPLICATION NO. : 09/801996
DATED : December 8, 2009
INVENTOR(S) : Masahiro Hinami It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1254 days.

Signed and Sealed this

Twenty-first Day of December, 2010

David J. Kappos
*Director of the United States Patent and Trademark Office*